United States Patent [19]

Bart et al.

[11] Patent Number: 4,537,635
[45] Date of Patent: Aug. 27, 1985

[54] TAR FRACTION FOR DRIVEWAY SEALERS USING OXIDIZED COAL TAR DISTILLATE

[75] Inventors: Edward F. Bart, Califon, N.J.; Arthur S. Chu, E. Amherst; George R. Cook, Buffalo, both of N.Y.

[73] Assignee: Allied Corporation, Morris Township, Morris County, N.J.

[21] Appl. No.: 557,784

[22] Filed: Dec. 5, 1983

[51] Int. Cl.³ .................. C08L 95/00; C09D 3/24; C10C 3/04
[52] U.S. Cl. .................. 106/277; 106/281 R; 106/284; 252/311.5
[58] Field of Search .................. 106/273, 281 R, 284, 106/283; 252/311.5

[56] References Cited

U.S. PATENT DOCUMENTS

| | | | |
|---|---|---|---|
| 3,221,615 | 12/1965 | McGovern | 106/273 |
| 3,304,191 | 2/1967 | Barrett | 106/279 |
| 3,868,263 | 2/1975 | McConnaughay | 106/284 |
| 4,052,290 | 10/1977 | Cushman et al. | 208/6 |
| 4,139,397 | 2/1979 | Yan | 106/278 |
| 4,222,916 | 9/1980 | Hergenrother | 524/66 |
| 4,339,346 | 7/1982 | Schulz | 252/311.5 |

OTHER PUBLICATIONS

Chem. Abstr. 90:108672m, E. Voitkovskaya et al., vol. 90, p. 314 (1979).
Chem. Abstr., Fossil Fuels, 89:217849f, S. Furibata, vol. 89, p. 147 (1978).

*Primary Examiner*—Dennis L. Albrecht
*Attorney, Agent, or Firm*—Arthur J. Plantamura; Jay P. Friedenson

[57] ABSTRACT

A driveway sealer less affected by temperature extremes can be made from an oxidized coal tar distillation cut. The sealer incorporates a middle cut crude distillate which is oxidized to produce a product of desired viscosity. The sealer incorporating this oxidized middle cut is less affected by extremes in weather as compared to regular sealer tar. It has more consistent physical properties. A significant distinguishing characteristic derived from the use of this tar in a driveway sealer is the reduced odor of the resulting sealer. The oxidation (condensation) step is carried out at elevated temperature by sparging copious quantities of air rapidly into the tar at elevated temperatures of the order of about 300° F. to 800° F. (200° C.–430° C.).

8 Claims, 2 Drawing Figures

TAR FRACTION FOR DRIVEWAY SEALERS USING OXIDIZED COAL TAR DISTILLATE

DESCRIPTION

BACKGROUND OF THE INVENTION

This invention relates to an improved driveway sealer tar and more specifically to a tar used as a raw material in the manufacture of driveway sealer emulsion. The improved tar, the subject of the instant invention, is prepared by oxidizing a selected coal tar distillation cut and is characterized by being relatively less brittle in cold weather and having significantly less odor as compared to commercially available tars.

Bituminous pavement sealers of two main types are used in roadway or driveway surfacing; those produced from asphaltic petroleums and those from coal tars. Typically, a bituminous pavement sealer is composed of water, clay and bitumen in the form of an emulsion. Other formulations are possible. Sealers produced from asphaltic bitumens tend to dissolve in petroleum oils and greases and, thus, surfaces composed of such bitumens suffer serious damage when exposed to such petroleum products, as for example, to jet fuel, gasoline or motor oil and the like.

Also used as sealers for bituminous pavements are emulsions manufactured from coal tars. These coal tars are obtained in the distillation of crude tars resulting from the destructive distillation of bituminous coal, the principal source of such tar being the by-product of coke ovens producing metallurgical coke. While coal tar derived compositions have superior wetting characteristics and are resistant to both water and petroleum oils and greases, they suffer from the disadvantage of having an unpleasant odor, becoming brittle at low temperatures or tending to soften excessively at higher temperatures. Characteristics of this kind are a drawback in sealer applications where the aim is to protect the paved surface contiguous to residences or business buildings.

Accordingly, a need exists for an improved bitumen for use in sealer manufacture. The use of the improved bitumen produced in accordance with the invention will result in a sealer which is less brittle in cold weather and which is characterized as having significantly less odor.

SUMMARY OF THE INVENTION

An object of the present invention is to provide an improved coal tar product useful as an essential component material in the manufacture of driveway or roadway surface sealer. Roadway and driveway surface sealers manufactured from the improved coal tar of the invention are characterized by reduced odor, improved low temperature flexibility, better hardness in hot weather and as having a practical rate of curing when applied to road or other surfaces.

Additional objects and advantages are accomplished by the present invention will be apparent from the detailed description which follows.

The improved sealer composition of the invention is obtained by isolating a middle cut from the distillation of crude tar, such as coke oven tar, and oxidizing this fraction by sparging it with air at elevated temperatures to yield a product having the desired viscosity (as measured by ASTM D139-77 float test analyses) of about 150 to about 400 seconds.

Use of the middle cut coal tar derivative in accordance with the invention has the effect of minimizing the low boiling fractions which have an increased tendency to soften in hot weather and of removing the higher boiling fraction minimizes the tendency to brittleness in cold weather.

Another effect of using the middle cut coal tar derivative of the invention is the production of a sealer characterized by its markedly reduced content of low boiling constituents as illustrated in FIGS. 1 and 2 of the drawing.

The composition of the distillate which is oxidized to produce the tar which is used in the driveway sealer according to the present invention are generally those that have distillation residues at 355° C. (according to ASTMD-246-73) in amounts of from about 25% to 100% and, preferably, from about 35% to 100%.

BRIEF DESCRIPTION OF THE DRAWING

In the drawing, the figures illustrate, by gas chromatography, the comparative absence of low boiling material in the oxidized coal tar product incorporated in the sealer of the invention when compared to tars used in prior art sealer.

DESCRIPTION OF THE PREFERRED EMBODIMENT

In accordance with the invention, the improved paved surface sealer emulsion composition is prepared by incorporating in the emulsion the oxidation product of a coal tar distillation cut.

The creosote starting material used in preparing the oxidized coal tar component of the sealer emulsion of this invention is that characterized as having a residue of 25% to 100% when measured by the ASTM Distillation Test, ASTM D20-72 (See ASTM, No. above) and, preferably, a residue of between about 35% and 100%.

In preparing the oxidized coal tar component, the creosote starting material is heated between about 300° F. (149° C.) and 800° F. (425° C.), preferably between about 600° F. (315° C.) and 725° F. (385° C.), while sparging copious amounts of air through the fluid as it is being heated. The simultaneous heating and sparging effectively (a) strips off low boilers and (b) oxidizes the residual tar as it is being heated. When the desired temperature limit is attained, typically at about 725° F., (385° C.) although it will be apparent that steady state oxidation may be accomplished at lower temperatures probably down to 300° F. (149° C.) the air sparging is continued at that temperature and until the desired oxidized product is obtained. This point is characterized as the state of the composition when a float test reading between about 150 and about 400 seconds at 50° C., and, preferably, between about 250 and about 350 seconds at 50° C. is reached. This property is measured by applying the ASTM Float Test for Bituminous Material, i.e., ASTM D139-77. Typically, an advantageous coal tar component for preparing the emulsion sealer of the invention is obtained when the product meets a float test of 300 seconds at 50° C. A more precise point for terminating the oxidation may be determined by the specific demands dictated by the end use for the oxidized coal tar fraction. This desired state may also be expressed in terms of viscosity which should be within the range of about 100 to about 500 cps. @ 220° F. (115° C.).

Figure 1:
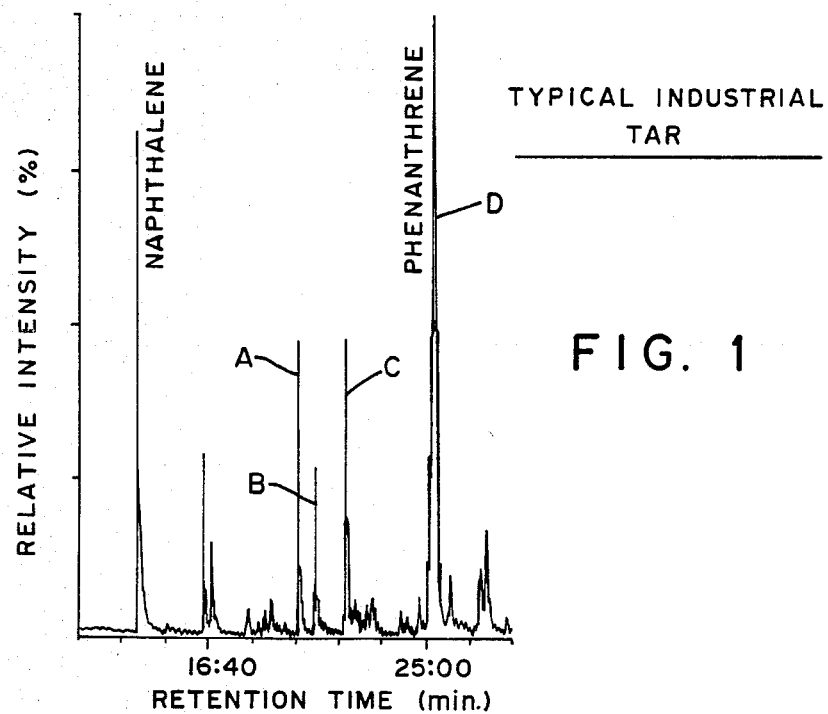
FIG. 1 illustrates the gas chromatography curve for typical industrial tars.

As shown in the drawing, the oxidized middle tar cut employed in accordance with the invention (FIG. 2) contains substantially less of the low boilers normally present in a typical prior art industrial tar (FIG. 1). The curves shown in the figures were derived by analyzing samples of a typical industrial tar (FIG. 1) and a middle cut portion which has a distillate residue of about 70%.

Figure 2:
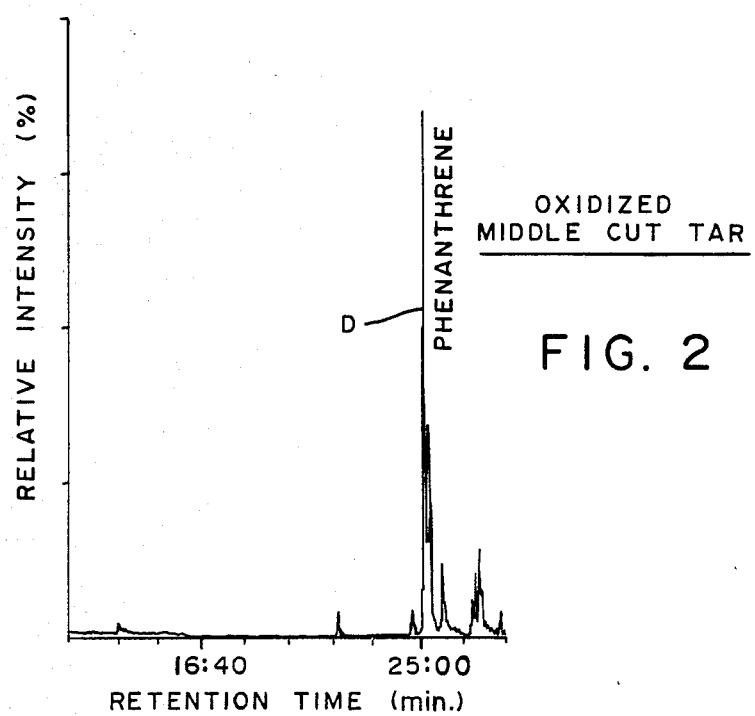
FIG. 2 illustrates the gas chromatography curve for a middle cut oxidized material of the invention.

As seen by reference to FIG. 2 comparatively little of such low boiling materials as acenaphthalene (peak "A"); dibenzofuran (peak "B"); 9-H fluorene (peak "C") and which are present in the composition of FIG. 1 are not present in the oxidized middle tar cut employed in accordance with the invention.

In general the oxidized middle tar cut oxidized heavy oil as prepared in accordance with the invention, contains less then 10 percent and usually less then 7 percent of the low boiling materials present in typical industrial tars that are used in commercial sealer compositions.

The invention will be further described by the following specific examples. It should be understood, however, that although these examples may describe in detail certain preferred operating conditions of the invention, they are given primarily for purposes of the illustration, and the invention in its broader aspects is not limited thereto. Parts expressed are parts by weight unless otherwise stated.

EXAMPLE 1

In this run, 2024 grams of heavy coal tar oil were charged to the laboratory reactor and preheated to 175° C. at which time air sparging was commenced at a rate of 500 standard cubic centimeters per minute (SCCM). The reactor was continually heated to 734° F. (390° C.) while oxidation and stripping continued. The total run took 6 hours. Forty-three percent of the original charge was stripped off as light organics, resulting in a 57% yield.

Resulting properties of the tar were:

| Float Test @ 50° C. | 306 seconds |
| --- | --- |
| Distillation (by ASTM D20-72) | |
| to 270° C. | 0% |
| to 300° C. | 1.4% |
| Softening Point of the Residue (by ASTM D36-76) | 43.2 |
| Toluene Insolubles (by ASTM D-40-72) | 9.2% |
| Viscosity cps @ 220° F. (105° C.) | 155 |
| @ 180° F. ( 32° C.) | 1030 |

EXAMPLE II

In this run, a production scale trial was performed by charging 9000 gallons of heavy coal tar oil at a temperature of 200° F. (94° C.) and sparging with air while heating the contents at an avg. rate of 35° F. (20° C.) per hour to 715° F. (380° C.). The average air flow rate was 137 standard cubic feet per minute (SCFM). During this experiment 51% of the original charge was stripped off as low boilers. The total batch time took 19 hours; of this 4 hours were used as downtime (air feed rate=0) for analyzing the reactor's contents.

The average oxygen utilization during the experiment was 66%.

An analysis of the heavy coal tar oil used as the raw material for this run is presented as Table I.

TABLE I

| Properties of the oil used as the raw material | |
| --- | --- |
| Specific gravity @ 100° F. (36° C.) | 1.131 |
| Water content (%) | 1 |
| Distillation (wt %) as determined by ASTM D246-73 | |
| to 210° C. | 0.0 |
| 235° C. | 0.0 |
| 270° C. | 2.6 |
| 300° C. | 11.0 |
| 315° C. | 16.3 |
| 355° C. | 44.8 |
| Residue | 57.7 |
| Properties of the tar produced from this run were: | |
| Sp.g @ 100° F. (36° C.) | 1.219 |
| Water | 0.0 |
| Float @ 50° C. (by ASTM D139-77) | 270 sec. |
| Xylene Insolubles % (by ASTM D20-72) | 10% |
| C-9 Distillation | |
| to 170° C. | 0.0 |
| to 270° C. | 0.0 |
| to 300° C. | 0.1 |
| Softening Point of Residue | |
| (by ASTM D36-76 | 43.0 |
| Viscosity (cP) @ 220° F. (115° C.) | 170 |
| @ 180° F. (182° C.) | 1075 |

In Table II, the ranges of the operating variables considered applicable are set forth.

TABLE II

| | Feasible Range | Preferable Range |
| --- | --- | --- |
| Quality of the raw material (as determined by % residue @ 355° C.) (by ASTM D246-73) | 20%–100% | 40–100 |
| Temperature at which oxidation is carried out | 200–900° F. (93° C.– 482° C.) | 400–750° F. (205° C.– 400° C.) |
| Pressure at which the oxidation occurs | 0 psia– 1000 psia | 14–70 psia |
| Air flow rate (SCFM/# original charge) | .0001–.1 | .001–.01 |
| % volatiles stripped off (100% yield) | 10%–70% | 15%–60% |

The data set forth in Table III summarizes and compares the physical characteristics of regular driveway sealer tar (prepared by the straight distillation of crude tar) with the physical characteristics of the tar prepared according to this invention.

TABLE III

| Property | Regular Driveway Sealer Tar Industry Limits | Typical Commercial Driveway Sealer Quality | Typical Quality of Tar Prepared According to Invention |
| --- | --- | --- | --- |
| Distillation[1] | | | |
| To 170° C., % | 1.0 max | 0 | 0 |
| 270° C. | 7.0 max | 1 max | 0 |
| 300° C. | 15.0 max | 5 max | 2 max |
| Soft point of the residue (Ring and ball) °C. | 40–60 | 42–48 | 41–47 |
| Brittleness[2] | more brittle after curing | | less brittle after curing |
| Odor[3] | significant during formulation application, and | very noticeable | very little odor |

TABLE III-continued

| Property | Regular Driveway Sealer Tar Industry Limits | Typical Commercial Driveway Sealer Quality | Typical Quality of Tar Prepared According to Invention |
|---|---|---|---|
| | | curing | |

(1) Less low boilers is consistent with low odor and less irritation.
(2) Tar prepared according to this invention results in a more durable coating.
(3) This has been substantiated by analytical results. Shown in the drawing wherein the absence of peaks indicates absence of the relatively odorous low boiling materials. In the formulation of the sealer composition characterized by a suitable viscosity for the desired spreadability properties, smooth application, low run-off, and other characteristics acknowledged as desirable by those skilled in the art, various known fillers and/or additives may be incorporated. Such additives must, of course, be compatible with the oxidized coal tar of the invention as well as with water, and may comprise any of a wide variety of known filler materials, such as, various clays, sand, mica, talc and the like.

It will be understood that considerable variation in the conditions and materials may be made within the disclosure provided herein and, therefore, it is not intended that the invention be limited except as set forth in the claims.

What is claimed is:

1. In an aqueous coal tar sealer emulsion composition having a liquid consistency for applying to pavement surfaces, the improvement wherein the coal tar component comprises an oxidized middle cut derivative of heavy coal tar oil, said middle cut containing less than 10 percent of material boiling below the boiling point of phenanthrene, and having a float test analysis of between about 150 seconds and 400 seconds as determined by ASTM D139-77.

2. A coal tar sealer emulsion composition having a liquid consistency for applying to paved surfaces comprising
   (a) a coal tar derivative,
   (b) a filler and
   (c) water
wherein (a) is an oxidized middle cut derivative of heavy coal tar oil said middle cut containing less than 10 percent of material boiling below the boiling point of phenanthrene, and having a float test analysis of between about 150 seconds and 400 seconds as determined by ASTM D139-77 and (b) and (c) are present in sufficient amounts to provide the desired viscosity.

3. The composition of claim 2 wherein (a) has a float test analysis of between about 250 seconds and 350 seconds.

4. The composition of claim 2 wherein (a) is present in amounts of between about 20% and 45% of the total weight and (b) is present in amounts of from about 10% to about 50%, the balance being water.

5. The composition of claim 4 wherein (a) is present in amounts of between about 25% and 40%.

6. The composition of claim 2 wherein the filler is clay.

7. The composition of claim 4 wherein the filler is clay.

8. A coal tar coating emulsion composition characterized essentially as containing (a) said middle cut containing less than 10 percent of material boiling below the boiling point of phenanthrene, and an oxidized coal tar fraction, having an ASTM D139-77 float test analysis of between about 250 seconds and 350 seconds; (b) clay; and (c) water.

* * * * *